(12) United States Patent
Dammann et al.

(10) Patent No.: US 6,554,975 B2
(45) Date of Patent: Apr. 29, 2003

(54) LIQUID GASIFICATION REACTOR

(76) Inventors: Wilbur A. Dammann, 1115 Carriage Rd., Papillion, NE (US) 68046; W. David Wallman, 1350 Northface Ct., Colorado Springs, CO (US) 80919

( * ) Notice: Subject to any disclaimer, the term of this patent is extended or adjusted under 35 U.S.C. 154(b) by 0 days.

(21) Appl. No.: 09/934,771

(22) Filed: Aug. 22, 2001

(65) Prior Publication Data

US 2003/0039599 A1 Feb. 27, 2003

(51) Int. Cl.$^7$ .............................................. C25D 17/00
(52) U.S. Cl. .................. 204/225; 204/164; 422/186.04; 422/186.21; 422/186.26
(58) Field of Search ................................ 204/225, 242, 204/278, 164; 422/186.04, 186.21, 186.26; 123/3; 205/637, 638

(56) References Cited

U.S. PATENT DOCUMENTS

| | | |
|---|---|---|
| 603,058 A | 4/1898 | Eldridge et al. |
| 887,989 A | 5/1908 | Weber |
| 1,327,495 A | 1/1920 | Smith |
| 1,529,764 A | 3/1925 | Bamber |
| 1,716,084 A | 6/1929 | Percy |
| 1,795,670 A | 3/1931 | Odell et al. |
| RE28,547 E | 9/1975 | Pacheco |
| 4,141,694 A | 2/1979 | Camacho |
| 4,181,504 A | 1/1980 | Camacho |
| 4,279,710 A | 7/1981 | Coughlin |
| 4,333,423 A | 6/1982 | Firey |
| 4,361,474 A | 11/1982 | Shoaf et al. |
| 4,472,172 A | 9/1984 | Sheer et al. |
| 4,487,683 A | 12/1984 | Bozzuto |
| 4,566,961 A | 1/1986 | Diaz et al. |
| 4,588,850 A | 5/1986 | Mueller et al. |
| 4,690,743 A | 9/1987 | Ethington et al. |
| 5,159,900 A | 11/1992 | Dammann |
| 5,417,817 A | 5/1995 | Dammann et al. |
| 5,435,274 A | 7/1995 | Richardson, Jr. |
| 5,692,459 A | 12/1997 | Richardson, Jr. |
| 5,792,325 A | 8/1998 | Richardson, Jr. |
| 5,826,548 A | 10/1998 | Richardson, Jr. |
| 6,113,865 A | 9/2000 | Dammann et al. |
| 6,117,401 A * | 9/2000 | Juvan ..................... 422/186.04 |
| 6,153,058 A | 11/2000 | Richardson, Jr. |
| 6,183,604 B1 | 2/2001 | Santilli |
| 6,183,608 B1 | 2/2001 | Dammann et al. |
| 6,217,713 B1 * | 4/2001 | Lee et al. .................... 204/164 |
| 2002/0008014 A1 * | 1/2002 | Adachi et al. .............. 204/164 |

FOREIGN PATENT DOCUMENTS

| | | |
|---|---|---|
| SU | 765517 | 9/1980 |
| SU | 1467234 | 3/1989 |

* cited by examiner

*Primary Examiner*—Nam Nguyen
*Assistant Examiner*—Wesley A. Nicolas

(57) ABSTRACT

A reactor includes a housing with an input port for liquid feedstock and an exhaust port for gas produced by a liquid gasification process. The housing includes a pressurized reaction chamber with a pair of spaced apart electrodes having inward free ends immersed in the liquid feedstock. One of the electrodes is mounted on an operable shaft, to move inward and outward relative to the other electrode. A drive mechanism for the operable shaft is located outside the reaction chamber to selectively move the shaft. The reaction chamber is pressurized to increase efficiency of the reactor, and the chamber within which the drive mechanism is located is pressurized to substantially the same pressure as the reaction chamber.

11 Claims, 2 Drawing Sheets

LIQUID GASIFICATION REACTOR

BACKGROUND OF THE INVENTION (1) Field of the Invention

The present invention relates generally to apparatus for rapid oxidation of liquid feed stock to produce gas, and more particularly to an improved liquid gasification reactor with a pressurized chamber and operating environment.

(2) Background Information

The inventors herein have disclosed a liquid gasification process and apparatus which utilizes rapid oxidation of a water based solution to produce a gas substantially composed of hydrogen and carbon monoxide ($COH_2$). The $COH_2$ is a gas which will burn very cleanly in oxygen or air, and therefore is desirable for use as a fuel for internal combustion engines and the like. When combusted, $COH_2$ produces carbon dioxide and water vapor, thereby adding very little, if any, pollution to the environment.

Storage of $COH_2$ gas can be a problem, and it is therefore desirable to produce $COH_2$ gas on an on-demand basis. U.S. Pat. No. 5,159,900 discloses the use of an electrical arc between two carbon electrodes submersed in water to produce the reaction necessary to rapidly oxidize carbon and produce $COH_2$ gas. Because the carbon electrodes were consumed during the reaction, there was no residue. While water can be easily added within the reaction chamber without disrupting the reaction, the carbon electrodes cannot be replaced in this reaction chamber without disrupting, the reaction. For this reason, the inventors herein developed a process and apparatus which continuously replenish the carbon electrodes from a biomass feedstock by alternately electroplating the electrodes.

U.S. Pat. No. 5,417,817 describes a sensor which detects the position of the it electrical arc within the reaction chamber and switches the polarity of the current to alternate the plating on the electrodes, thereby maintaining the point of reaction near the center of the chamber. U.S. Pat. No. 6,183,608 discloses an electrode positioning mechanism that senses the physical electrode contact pressure to protect the carbon deposit on the electrode from excessive contact pressure when the arc is initially struck and during operation of the apparatus.

Improvements to the efficiency of the reaction chamber were accomplished in U.S. Pat. No. 6,113,865, wherein light energy of the electric arc is reflected and focused into the point of reaction using a highly reflective spherical reaction chamber. When focused back to the point of reaction, light energy is converted to heat and added to the heat of the reaction. Because this process is an endothermic reaction, the recovered light energy, as heat, will increase the rate of reaction and improve the efficiency of gas production.

Observations during ongoing development of the rapid oxidation process have provided information relative to the pressure generated by the electro-thermochemical reaction (electrochemical). As pressure increased, the reaction kinetics (rate or speed) also increased, resulting in a greater volume of gas being produced within a predetermined time, but without increasing the electrical energy input. These observations are fully in accord with the Le Châtelier principle. As noted in U.S. Pat. No. 6,113,865, it is desirable to increase pressure at the reaction point in order to increase the efficiency of the reaction.

While an increase in pressure will clearly increase efficiency of the reactor, the practical aspects of providing this increased pressure within the reaction chamber have thus far not been overcome. Because the positioning mechanism of the electrodes is sensitive to physical contact pressure, a higher chamber pressure will cause the pressure differential between the inside of the reaction chamber and the outside (ambient) environment to increase to a value which causes the positioning mechanism to erroneously reverse. Thus, the positioning mechanism would have difficulty in distinguishing between contact pressure of the electrode and the pressure differential between the interior of the chamber and the exterior.

Other practical problems encountered with increasing the pressure within the reaction chamber include the necessity of using tight fitting seals for the movable electrode holders. This also would negate the sensitivity of the electrode physical contact sensing feature of the positioning mechanism, and would also require a more powerful drive system to overcome the drag caused by the tighter seals.

BRIEF SUMMARY OF THE INVENTION

It is therefore a general object of the present invention to provide an improved reactor configuration for a liquid gasification process which enhances the efficiency of the electro-thermochemical reaction by increasing pressure within the reaction chamber.

Another object of the invention is to provide an improved reactor that includes an electrode positioning mechanism and sensors for detecting physical contact pressure of the electrodes, while operating within a pressurized reaction chamber.

These and other objects will be apparent to those skilled in the art.

The reactor of the present invention includes a housing with an input port for liquid feedstock and an exhaust port for gas produced by a liquid gasification process. The housing includes a pressurized reaction chamber with a pair of spaced apart electrodes having inward free ends immersed in the liquid feedstock. One of the electrodes is mounted on an operable shaft, to move inward and outward relative to the other electrode. A drive mechanism for the operable shaft is located outside the reaction chamber to selectively move the shaft. The reaction chamber is pressurized to increase efficiency of the reactor, and the chamber within which the drive mechanism is located is pressurized to substantially the same pressure as the reaction chamber.

BRIEF DESCRIPTION OF THE SEVERAL VIEWS OF THE DRAWINGS

The preferred embodiment of the invention is illustrated in the accompanying drawings, in which similar or corresponding parts are identified with the same reference numeral throughout the several views, and in which.

DETAILED DESCRIPTION OF THE INVENTION

Figure 1:
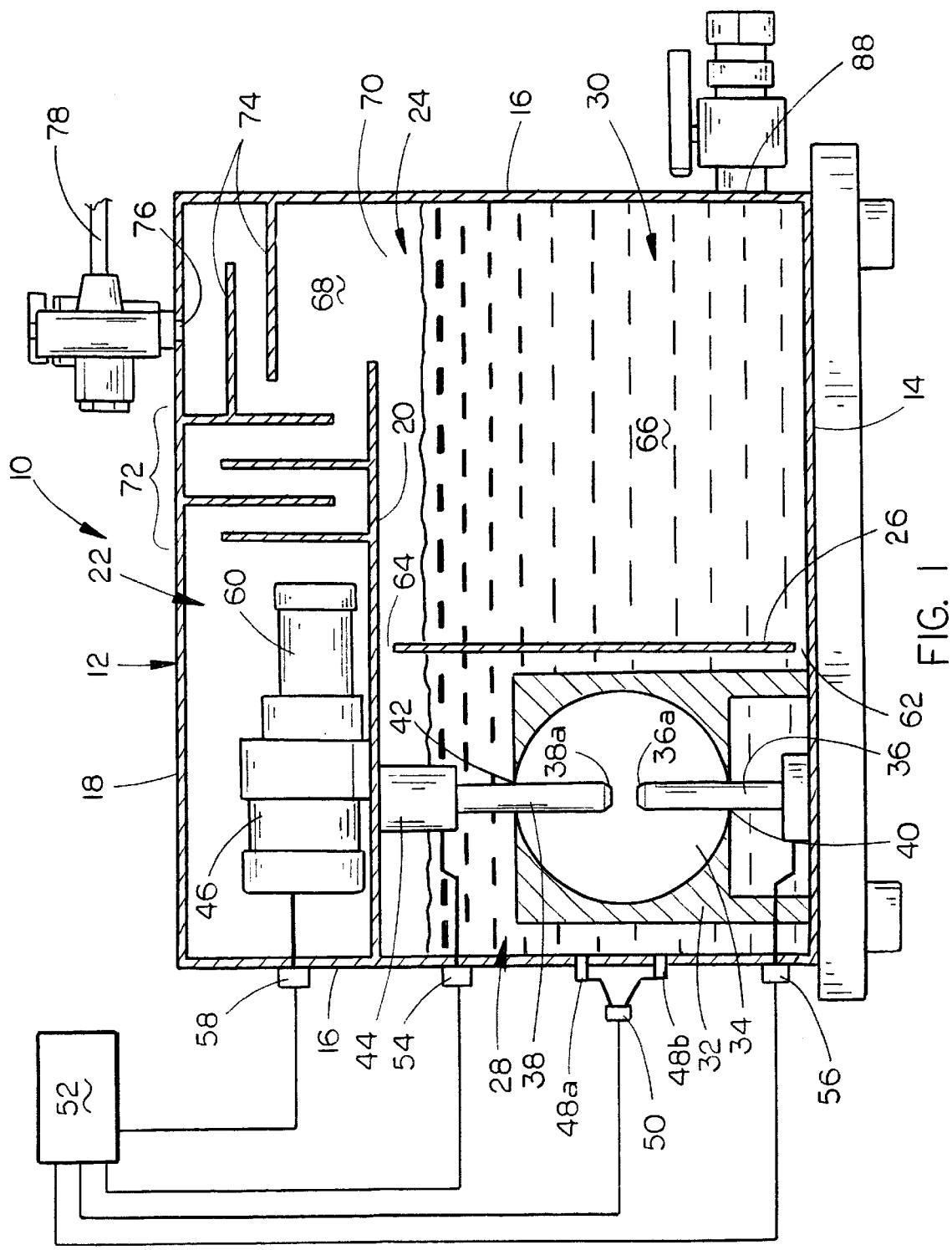
FIG. 1 is a side elevational view of the reactor of the present invention with portions of the side wall removed to show the interior thereof.

Referring now to the drawings, and more particularly to FIG. 1, the liquid gasification reactor of the present invention is designated generally at 10 and includes an enclosed housing 12 capable of being pressurized and including a bottom 14, side walls 16, and top 18.

A horizontal, intermediate wall 20 divides the interior cavity of reactor housing 12 into an upper chamber 22 and a lower chamber 24. A vertically oriented baffle 26 in lower chamber 24 divides the lower chamber into a reaction chamber 28 and a feed stock chamber 30. An insert 32 within reaction chamber 28 has a generally spherical interior cavity 34 within which electrodes 36 and 38 project to create an arc. An inlet opening 40 in the lower end of insert 32 allows liquid into the cavity 34, and an exhaust opening 42 at the upper end of insert 32 provides for the discharge of gas from cavity 34. Preferably, the spherical wall surface 34a of cavity 34 is light reflective, to prevent dissipation of light energy, and assist in focusing the light energy proximal to the center of cavity 34.

Electrode 36 is fixed in position on bottom 14 and extends upwardly into cavity 34 with its inward end 36a proximal to the center of cavity 34. The second electrode 38 is mounted on a servo shaft 44 which is operable to slide inwardly and outwardly from cavity 34 in reaction chamber 28 by a servo drive 46 mounted within upper chamber 22. Electrode 38 is coaxial with electrode 36, and designed to slide inwardly and outwardly along its longitudinal axis to control the distance between the inward ends 38a and 36a of electrodes 38 and 36 respectively.

A pair of position sensor connectors 48a and 48b are mounted in side wall 16 of housing 12 adjacent electrodes 36 and 38. Position sensor connectors 48a and 48b are connected at a junction 50 and electrically connected to a control unit 52. Position sensors connected to position sensor connectors 48a and 48b are linked to compare the radiated energy of the electric arc extending between electrodes 36 and 38 at the different locations, to determine the position of the arc within cavity 34, and thereby determine the location of the inward ends 36a and 38a of electrodes 36 and 38.

Electrode connectors 54 and 56 are also mounted in a side wall 16 proximal to reaction chamber 28, and are electrically connected to electrodes 38 and 36 respectively, to supply an electrical current thereto. Electrode connectors 54 and 56 are also electrically connected to control unit 52, which supplies electrical current to electrodes 38 and 36. A servo control connector 58 is mounted in housing side wall 16 proximal servo drive 46, to provide power and control to servo drive 46, and associated motor 60. Connector 58 is also connected to control unit 52.

As shown in FIG. 1, lower chamber 24 is substantially filled with a liquid feedstock solution. The feedstock solution is preferably rich in carbon. The inventors have experimented with a biomass feedstock solution of water and glucose, as well as water and sucrose, but it is believed that any carbon-rich solution would work equally as well. Such carbon-based liquids and solutions, including carbohydrates and alcohols would also provide the necessary component for the feedstock. Carbohydrates such as cellulose, starches, sugars and glycogens are readily available for such use.

In addition, many sources of biomass feed stock solutions may be used with the biomass gasification process. Plant materials such as corn stalks, wheat straw, wood, grasses, leaves, sawdust, and common "yard waste", may be converted into a feed stock solution. Other organic substances, such as lignocelluloses materials (including agricultural waste such as manure, municipal solid waste, and residue from logging operations) may be effectively utilized.

As shown in FIG. 1, reaction chamber 28 is preferably separated from feed stock chamber 30 by baffle 26. A lower passageway 62 extends under baffle 26, and an upper passageway 64 extends over baffle 26, to permit the passage of liquid feed stock 66 and $COH_2$ gas 68, respectively, between reaction chamber 28 and feed stock chamber 30.

An opening 70 in horizontal wall 20 is preferably located over feed stock chamber 30, and disposed opposite reaction chamber 28. A plurality of vertically-oriented baffles 72 are arranged between opening 70 and the servo drive 46, to form a serpentine pathway which acts as a gas/liquid separator. A plurality of horizontal baffles 74 are arranged between opening 70 and an exhaust port 76, to form a serpentine path. A gas line 78 extends from exhaust port 76 to a storage chamber or the like, to supply $COH_2$ gas to a predetermined location. Optionally, a control valve and/or regulator may be added downstream of exhaust port 76, to control the flow of gas from reactor 10.

A liquid feed stock input/output port 80 is formed in side wall 16 adjacent feed stock chamber 30, to selectively provide liquid feed stock solution to feed stock chamber 30.

It can be seen that the use of baffles 72 to isolate servo drive 46 from reaction chamber 28 permits the self-regulating equalization of pressure between reaction chamber 28 and upper chamber 22. In this way, no special seals are needed between upper chamber 22 and reaction chamber 28 to provide for the slidable movement of servo shaft 44, nor is modification needed for the positioning mechanism described in U.S. Pat. No. 6,183,608 which forms a part of servo drive 46 (but not shown in detail herein). The pressurization of reaction chamber 28 is preferably provided by the rapid oxidation process occurring within cavity 34 during operation of the reactor 10. The pressure resulting by the production of $COH_2$ gas may be regulated through exhaust port 76 by valves or other well known devices.

Figure 2:
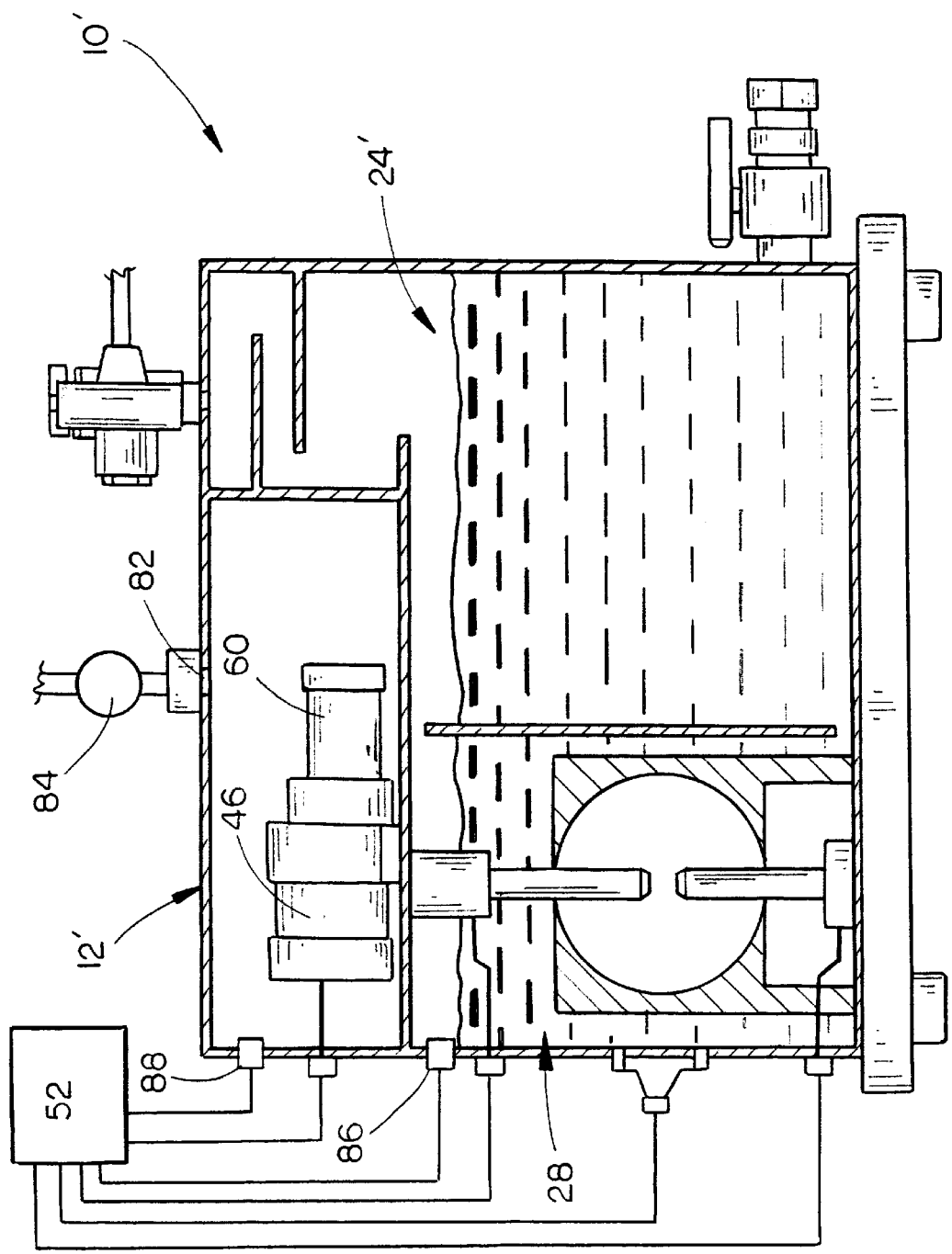
FIG. 2 is a schematic view of a second embodiment of the invention.

Referring now to FIG. 2, a second embodiment of the reactor is designated generally at 10', and differs from the first embodiment in the provision of a completely sealed upper chamber 22', separate from lower chamber 24'. Upper chamber 22' holds servo drive 46 and motor 60 in the same manner as the first embodiment, but requires a separate port 82 with pump 84 fluidly connected thereto to pressurize the upper chamber 22' with air or inert gas. In addition, pressure sensors 86 and 88 are provided in each of reaction chamber 28' and upper chamber 22'. Sensors 86 and 88 are electrically connected to control unit 52, to detect the pressure in each chamber and provide for equalization of the pressures via pump 84.

Whereas the invention has been shown and described in connection with the preferred embodiments thereof, it should be understood that many modifications, substitutions and additions may be made which are within the intended broad scope of the appended claims.

We claim:

1. A reactor for a liquid gasification process, comprising:
   a housing with an input port for selectively providing liquid feedstock to a reaction chamber;
   an exhaust port in the housing, for exhausting gas produced during the gasification process;
   a pressurized reaction chamber at least partially filled with a liquid;
   a pair of spaced-apart electrodes disposed within the reaction chamber with inward free ends immersed in the liquid;
   means for creating an electric arc between the electrodes;
   one of said electrodes mounted on a shaft, the shaft operable to move the mounted electrode inwardly and outwardly relative to the other electrode;

a drive means mounted in a drive chamber located outside the reaction chamber, for selectively moving the shaft; and means for pressurizing the drive chamber to substantially the same pressure as the reaction chamber.

2. The reactor of claim 1, wherein said drive chamber is sealed and separate from the reaction chamber.

3. The reactor of claim 2, further comprising:

a first pressure sensor located in the reaction chamber and electrically connected to a control unit;

a second pressure sensor located in the drive chamber and electrically connected to the control unit;

said control unit connected to said means for pressurizing the drive chamber, and operable to compare the sensed pressures and operate the means for pressurizing the drive chamber to substantially equalize the pressures.

4. The reactor of claim 1, wherein said drive chamber is located within the reactor housing and is in fluid communication with the reaction chamber.

5. The reactor of claim 4, wherein the reaction chamber is located below the drive chamber, and further comprising means for separating liquid in the reactor from the drive chamber.

6. The reactor of claim 5, wherein the means for separating liquid in the reactor from the drive chamber includes a plurality of vertically-oriented baffles forming a serpentine fluid path between the drive chamber and the reaction chamber.

7. The reactor of claim 4, wherein said reaction chamber is housed within a lower chamber in the reactor, and further comprising a feedstock chamber within the lower chamber and separated from the reaction chamber by a vertically oriented baffle.

8. The reactor of claim 7, wherein the baffle between the reaction and feedstock chambers has a passageway over an upper end for permitting the passage of gas between the reaction and feedstock chambers, and a passageway under a lower end for permitting the passage of liquid between the reaction and feedstock chambers.

9. The reactor of claim 1, wherein the electrodes are coaxially aligned.

10. The reactor of claim 1, wherein at least one of said electrodes is formed of a carbon material.

11. The reactor of claim 1, wherein the liquid includes water and carbon.

* * * * *